INVENTORS.
William H. Dumbaugh
James E. Flannery
George B. Hares

INVENTORS.
William H. Dumbaugh
James E. Flannery
George B. Hares

Aug. 1, 1972   W. H. DUMBAUGH, JR., ET AL   3,681,098
OPAL GLASS COMPOSITIONS COMPRISING CALCIUM FLUORIDE
Filed Jan. 14, 1970                                3 Sheets-Sheet 3

— CODE 7900 SHEET

— MOLTEN GLASS

INVENTORS.
William H. Dumbaugh
James E. Flannery
George B. Hares
BY
ATTORNEY

Patent text follows …

United States Patent Office 3,681,098
Patented Aug. 1, 1972

3,681,098
OPAL GLASS COMPOSITIONS COMPRISING CALCIUM FLUORIDE
William H. Dumbaugh, Jr., Painted Post, and James E. Flannery and George B. Hares, Corning, N.Y., assignors to Corning Glass Works, Corning, N.Y.
Filed Jan. 14, 1970, Ser. No. 2,769
Int. Cl. C03c 3/04
U.S. Cl. 106—52        2 Claims

ABSTRACT OF THE DISCLOSURE

This invention relates to the manufacture of spontaneous opal glasses wherein the opacity therein is the result of amorphous droplets and calcium fluoride ($CaF_2$) crystals. More specifically, this invention relates to spontaneous opal glasses consisting essentially, by weight on the oxide basis, of about 50–75% $SiO_2$, 3–14% $Al_2O_3$, 10–20% CaO, 3–10% $R_2O$, wherein $R_2O$ consists of 0–7% $Na_2O$ and 0–7% $K_2O$, 0.25–5% $MoO_3$ and/or $WO_3$ and/or $As_2O_3$ and 2–5% F.

---

Opal glasses are light diffusing glasses wherein the scattering of light passing therethrough is caused by small particles contained within the glassy phase. Hence, the optical properties of opal glasses are the result of the fact that opal glasses comprise two phases. In all instances, there will be a transparent glassy phase whereas the other phase can vary widely in its characteristics. Nevertheless, this second phase will generally consist of more or less finely distributed particles suspended in the transparent glassy phase. The primary proporties of the dispersed phase, i.e., the opacifying phase, which determine opacity are the refractive index, the dispersion, the size and shape of the particles, the particle distribution, and the absolute number of particles, The light transmissivity of opal glasses can vary from near-transparent to opaque.

An opal glass is commonly produced by including in a glass batch a small amount of the ingredients of a compound which is soluble in the glass but which can be crystallized therefrom, the proportions being adequate to stimulate the development of invisible nuclei of the compound when the glass is cooled and/or thereafter reheated. The growth of these nuclei to form light-diffusing crystals may take place either during cooling or when the glass article is subsequently reheated. A spontaneous opal glass contemplates the first crystallization mechanism.

Therefore, a spontaneous opal derives the bulk of its opacity during the initial cooling of the melted batch to a glass article and is not materially increased in opacity by later reheating. Hence, the opacifying agent "strikes in," i.e., precipitates throughout the glass article, during the shaping thereof utilizing conventional glass forming techniques such as blowing, casting, drawing, pressing, and rolling. It is quite apparent that the elimination of any reheat treatment reduces the production cost of finished articles and, therefore, spontaneous opal glasses are normally preferred in commercial practice.

Since the amount of crystallinity commonly present in an opal glass is low, generally about 5–10% by weight, the degree of opacity demonstrated thereby is principally derived from the difference in the refractive indices of the opacifying phase and the glassy matrix although, as has been explained above, the number, size, and shape of the opacifying particles also significantly affect the opacity of the final product.

One serious problem endemic with spontaneous opal glasses has been the attainment of dense opacity during the very rapid melt quenching techniques which are sometimes employed in forming glass articles. Hence, such rapid cooling produces a hazy, near-transparent body.

Therefore, the principal object of the present invention is the production of spontaneous opal glasses which "strike in" extremely rapidly and exhibit very dense opacity in thin section.

Other objects will become apparent from a study of the following description of the invention and an examination of the appended drawings wherein:

FIG. 1 is a replica electron micrograph illustrating the structure of a commercially-marketed spontaneous opal glass;

FIGS. 2, 3, and 4 are replica electron micrographs depicting the structure of the opal glasses manufactured in accordance with this invention;

FIG. 7 illustrates an apparatus utilized for drawing thin sheets of glass as an aid in evaluating opacity and rate of strike in.

We have discovered that spontaneous opal glasses which strike in extremely rapidly and which exhibit exceptionally dense opacity in thin section can be produced from compositions consisting essentially, by weight on the oxide basis, of about 50–75% $SiO_2$, 10–20% CaO, 3–14% $Al_2O_3$, 3–10% $R_2O$, wherein $R_2O$ consists of 0–7% $Na_2O$ and 0–7% $K_2O$, 0.25–5% of $MoO_3$ and/or $WO_3$ and/or $As_2O_3$, and 2–5% F. X-ray diffraction analyses of these opal glasses have indicated $CaF_2$ to be the only crystal phase present in any appreciable quantity.

Table I records examples of glass composition, expressed in weight percent on the oxide basis, operable in the instant invention. The ingredients for the actual glass batches may comprise any materials, either the oxides or other compounds, which, in being melted together, will be converted to the desired oxide compositions in the proper proportions. In accordance with conventional glass analysis practice, the fluorine present is recorded as the entity, fluoride, since it is not known with which cation it is bonded.

Since fluorine is very readily volatilized at the melting temperatures commonly employed with these glasses, viz, about 1450°–1550° C., the loss thereof from the melt due to this factor can be as great as 50% of the quantity originally included in the batch. However, inasmuch as this volatility loss is obviously a function of the melting times and temperatures employed, it will readily be appreciated that a person of ordinary skill in the glassmaking art can easily calculate an initial composition for the batch which will compensate for such loss and/or take special precautions to decrease this volatilization, e.g., melting the batch in enclosed units.

The examples reported in Table I utilized the following batch ingredients in the necessary proportions to yield this composition recited therein:

Sand
Calcined alumina
Calcium carbonate
Sodium carbonate
Calcined potassium carbonate
Calcium fluoride
Molybdenum trioxide
Tungstic acid
Arsenic pentoxide The match materials were melted in an electrically-fired furnace for four hours at 1450° C. in covered platinum crucibles. Shapes of glass were formed by two means.

Figure 7:

In the first method, the melt were merely poured onto a steel plate to form a round glass patty about 8" in diameter and ½" thick. The patty was allowed to solidify and then annealed. In the second method, thin sheets of glass were drawn utilizing the apparatus pictured in FIG. 7. Thus, a piece of Corning Code 7900 glass sheet about 6" x 3" x ¼" was employed as a punty. The crucible containing the molten batch was removed from the furnace at 1450° C. and one edge of the glass punty immediately dipped into the melt and a thin sheet of glass about $\frac{1}{32}$" to $\frac{1}{64}$" thickness handdrawn therefrom. Many normally dense spontaneous opal glasses, Corning Code 6720 glass, for example, produce an almost transparent sheet in this procedure. These thin sheets enabled relative strike-in rates to be estimated as well as visual observations made as to the density of the opacity generated. The articles were annealed by transferring them to an annealer operating at about 550° C.

Table I further records various physical properties obtained on Example 1 such as annealing point, strain point, coefficient of thermal expansion over the range 25°–300° C. ($\times 10^{-7}$/° C.) and density (g./cc.) which were determined in the conventional manner. The other examples recited in Table I would demonstrate physical properties quite similar in value to those of Example 1.

TABLE I

| Example | 1 | 2 | 3 | 4 | 5 | 6 | 7 | 8 | 9 |
|---|---|---|---|---|---|---|---|---|---|
| SiO$_2$ | 62.7 | 62.1 | 62.1 | 66.6 | 65.9 | 65.6 | 63.2 | 62.5 | 62.5 |
| Al$_2$O$_3$ | 11.9 | 11.7 | 11.7 | 6.2 | 6.2 | 6.2 | 12.0 | 11.9 | 11.9 |
| CaO | 11.9 | 11.7 | 11.7 | 15.9 | 15.9 | 15.8 | 11.9 | 11.8 | 11.8 |
| Na$_2$O | 4.0 | 4.0 | 4.0 | 5.1 | 5.1 | 5.0 | 4.2 | 4.2 | 4.2 |
| K$_2$O | 3.4 | 3.4 | 3.4 | 2.0 | 1.9 | 1.9 | 3.5 | 3.5 | 3.5 |
| F | 4.1 | 4.1 | 4.1 | 3.1 | 3.0 | 3.0 | 3.1 | 3.1 | 3.1 |
| MoO$_3$ | 2.0 |   |   | 1.1 |   |   | 2.1 |   |   |
| WO$_3$ |   | 3.0 |   |   | 2.0 |   |   | 3.0 |   |
| As$_2$O$_3$ |   |   | 3.0 |   |   | 2.5 |   |   | 3.0 |

Note.—Annealing point, 709° C.; Strain point, 668° C.; Exp. coefficient. 76.7; Density, 2.478.

The most important characteristics of these glasses is their extremely dense and even opacity. Thus, all these glasses and, in particular, Examples 1, 2 and 3 manifest a whiteness and depth of opacity only very rarely observed in spontaneous opal glasses and which is tantamount to that found in some glass-ceramic articles. This extreme degree of opacity is encompassed within our preferred range of compositions of 60–70% SiO$_2$, 5–13% Al$_2$O$_3$, 11–17% CaO, 3–6 Na$_2$O, 1–5% K$_2$O, 2–4% F, and 1–4% MoO$_3$ and/or WO$_3$ and/or As$_2$O$_3$.

To illustrate this dense opacity, Table II records densitometer readings in transmission through 0.041" thick sections of a Corning Code 6720 glass dinner plate, Examples 1, 2 and 3, and a spontaneous opal glass (Example 10) having the approximate base composition as Examples 1, 2 and 3 but with no opacity densifying agent, viz., MoO$_3$, WO$_3$ or As$_2$O$_3$ present therein. Thus, this last glass consisted essentially, by weight on the oxide basis, of

EXAMPLE 10

|  | Percent |
|---|---|
| SiO$_2$ | 63.9 |
| Al$_2$O$_3$ | 12.1 |
| CaO | 12.1 |
| Na$_2$O | 4.2 |
| K$_2$O | 3.5 |
| F | 4.2 |

TABLE II

| Glass: | Percent transmission |
|---|---|
| Corning Code 6720 | 55 |
| Example 1 | 12.7 |
| Example 2 | 10.2 |
| Example 3 | 8.5 |
| Example 10 | 25.0 |

Table II is believed to clearly demonstrate the effect of the opacity densifying agents upon the overall opacity of these spontaneous opals. Hence, the densities secured with their use are two-to-three times greater than glasses of the same base composition, but without their presence, and more than three times greater than the commercially-marketed Corning Code 6720 glasses even when that glass is cooled relatively slowly to permit extensive crystallization to take place therein. As was noted above, Corning Code 6720 glass will be nearly transparent when the melt thereof is as rapidly quenched as that described above for the glasses of the instant invention. Corning Code 6720 glass has the following approximate composition in weight percent on the oxide basis:

|  | Percent |
|---|---|
| SiO$_2$ | 59.8 |
| Al$_2$O$_3$ | 10.3 |
| CaO | 4.8 |
| Na$_2$O | 8.5 |
| K$_2$O | 2.1 |
| ZnO | 10.1 |
| B$_2$O$_3$ | 1.4 |
| F | 3.0 |

Softening point: 775° C.
Annealing point: 547° C.
Strain point: 511° C.
Exp. coefficient: 80
Density: 2.58

Inasmuch as essentially the only crystal phase determined by X-ray diffraction analysis to be present in the five opal glasses recited in Table II was CaF$_2$, electron micrographs were examined of each to study the microstructure thereof. Hence, FIGS. 1–5 are replica electron micrographs of Corning Code 6720 glass, Example 1, Example 2, Example 3, and Example 10, respectively. In each instance, an HCl-H$_3$BO$_3$ etchant was utilized which dissolves CaF$_2$. The white bar at the bottom of each micrograph represents 1 micron.

Even the most cursory study of these micrographs manifests that the morphology of the opal particles in Examples 1, 2, 3, and 10 is spherical whereas that of the Code 6720 glass is the preferred orientation of CaF$_2$ crystals. Thus, the Code 6720 glass was cooled slowly enough to allow substantial crystallization of CaF$_2$ whereas the other glasses were not.

Figure 1:
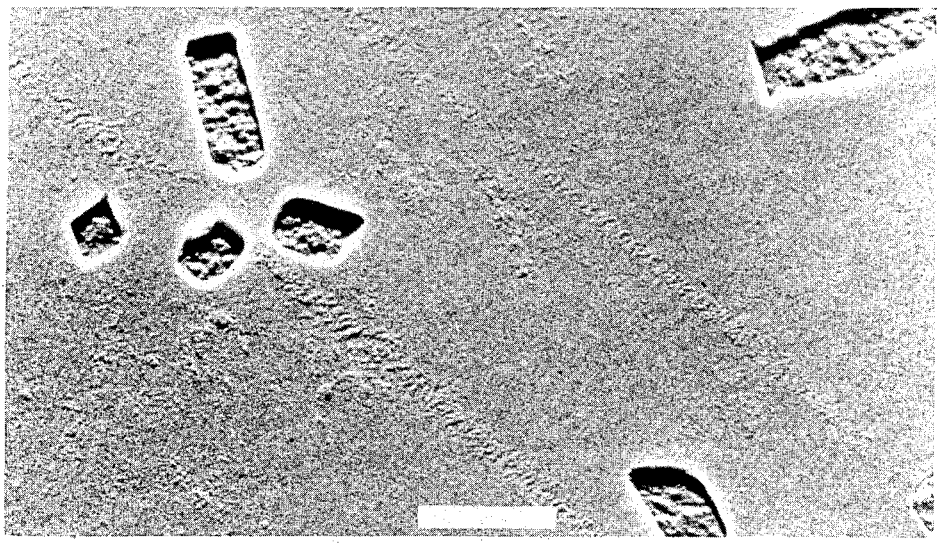
Figure 2:
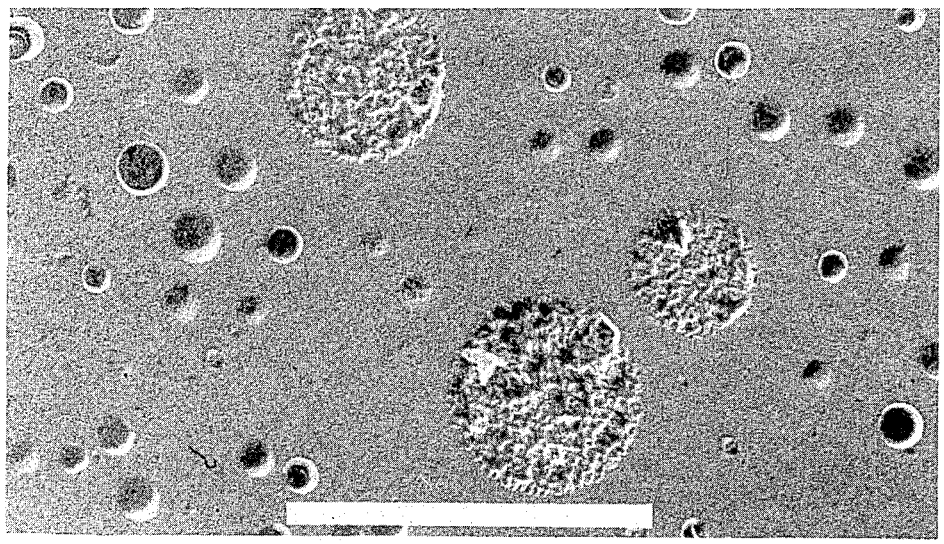

FIGS. 2–5 depict the areas of crystallization to be spherical, indicating that as the melt cools a liquid-liquid phase separation first occurs with crystallization taking place thereafter. The spherical shape can also demonstrate that the matrix glass was too viscous to allow the crystals to grow with a preferred orientation at the crystallization temperatures. An examination of these electron micrographs indicates two kinds of heterogeneities in the glasses. Hence, although they can be observed in FIGS. 4 and 5, they are more conspicuous in FIGS. 2 and 3. In FIG. 2, there are droplets which are approximately 0.1 micron in diameter and larger heterogeneities about 0.5 micron in diameter. The larger heterogeneities have been termed CaF$_2$ droplets whereas the smaller heterogeneities have been termed phase separated droplets. The opacity of a given sample can be a function of the size and number of heterogeneities present therein.

Figure 3:
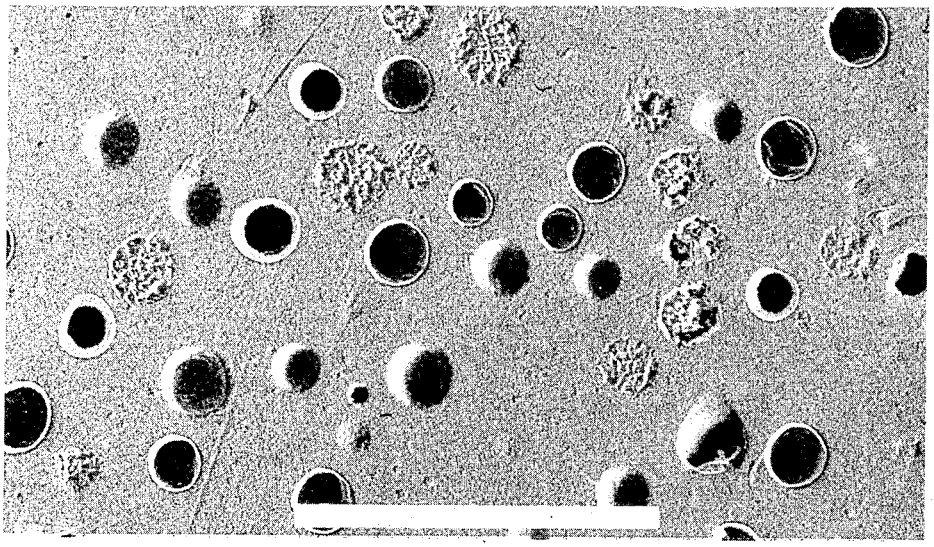
Figure 4:
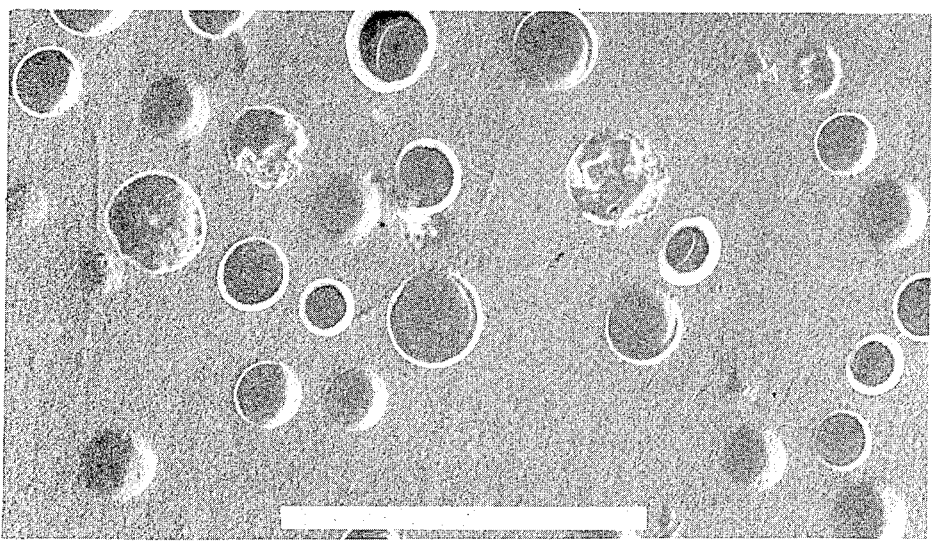
Figure 5:
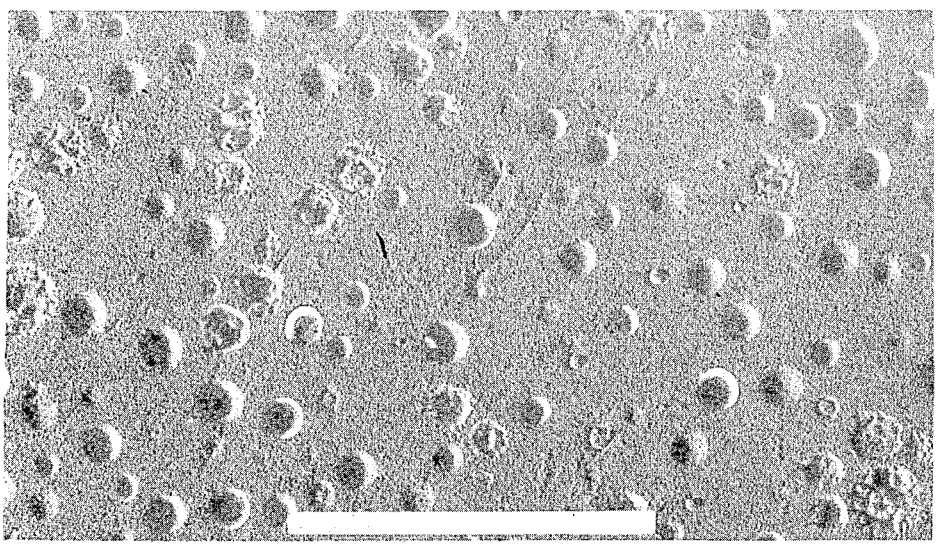
FIG. 5 is a replica electron micrography demonstrating the structure of an opal glass having the same general base composition as the glass of this invention but without the opacity enhancing ingredients.

Hence, comparing FIGS. 4 and 5 and 3 and 5, it will be observed that in each instance the more opaque glass has fewer, but larger, droplets. Consequently, it has been concluded that adding WO$_3$ and As$_2$O$_3$ to the base glass composition enhances the opacity of the glass by increasing the droplet size.

In comparing FIGS. 3 and 4, it can be seen that the droplets in FIG. 4 are slightly larger than the droplets in FIG. 3 but there are more droplets present in FIG. 3 than in FIG. 4. Apparently, then, the increased number of droplets was more effective in enhancing opacity than was the slight difference in size. No substantive distinction is possible through comparing these two figures with respect to the effectiveness of the CaF$_2$ droplets and the phase separated droplets in improving opacity, since the number and size of both kinds of droplets go together.

When comparing FIGS. 2 and 5 it can readily be observed that the phase separated droplets are of nearly the same size in each but the CaF$_2$ droplets in FIG. 2, while fewer in number, are much larger than in FIG. 5. Inasmuch as the number of both types of droplets is greater in FIG. 2 than in FIG. 5, it is believed apparent that the larger CaF$_2$ droplets account for the increased opacity. Therefore, it has been concluded that the addition of MoO$_3$ to the base composition deepens the opacity of the glass by enlarging the size of the CaF$_2$ droplets.

Figure 6:
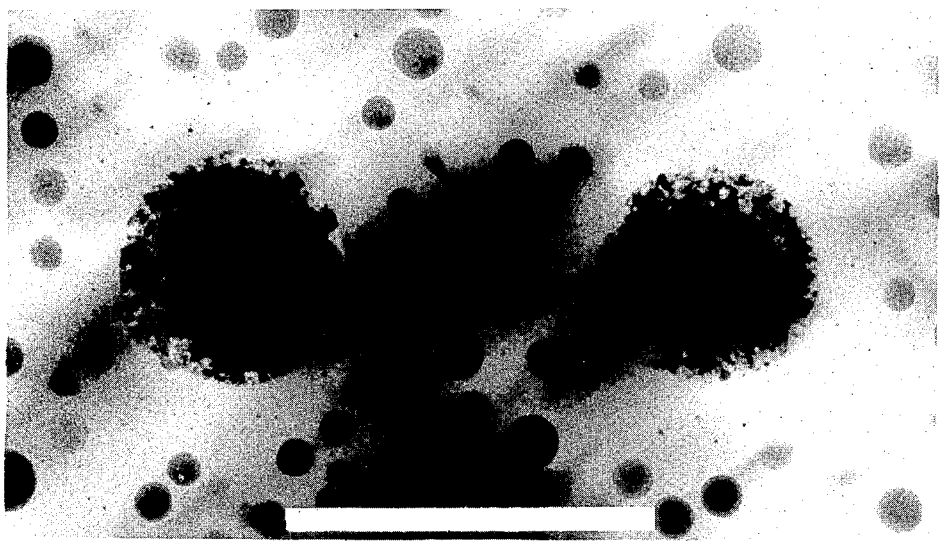
FIG. 6 is a transmission electron micrograph exhibiting the structure of an opal glass produced in accordance with this invention.

To further study the heterogeneities present in the opal glasses of this invention, a transmission electron micrograph (FIG. 6) was taken of an ion-thinned sample of Example 1 at the same magnification as FIGS. 2–5. That there are two kinds of heterogeneities present is immediately evident from FIG. 6. In dark field microscopy, it was observed that only the larger droplets contained crystalline material and, since CaF$_2$ was the only crystal phase detected in any appreciable quantity by X-ray diffraction analysis, it was concluded that the crystalline material contained in these droplets is CaF$_2$.

We have discovered that the compositional limitations of glasses operable in our invention are quite critical in securing very dense opacity accompanied with extremely rapid strike in. Hence, increasing the Al$_2$O$_3$ content above about 14% results in the glasses becoming seedy and viscous. Additions of flourine above about 5% F can improve opacity but greatly depress the viscosity of the glass. Increasing the Na$_2$O and/or K$_2$O content above about 10% lowers the viscosity of the glass and hazards the formation of NaF and/or KF rather than CaF$_2$. Additions of MoO$_3$, WO$_3$, and/or As$_2$O$_3$ above about 5% do not appear to improve depth of opacity and can result in the development of crystals of these compounds leading to a less homogeneous-appearing opal. Less than about 10% CaO results in too little opal phase and above about 20% CaO softens the glass excessively.

Small additions of various compatible metal oxides can be tolerated but the total of all such additions is preferably held less than about 10% by weight. Thus, MgO, SrO, BaO, TiO$_2$, ZrO$_2$, PbO, P$_2$O$_5$, B$_2$O$_3$, and ZnO may be useful in improving glass-working qualities, altering the coefficient of thermal expansion, or providing better chemical durability to the glasses of the invention. The conventional glass colorants, e.g., CoO, CeO$_2$, NiO, V$_2$O$_5$, U$_3$O$_8$, Fe$_2$O$_3$, Cr$_2$O$_3$, and MnO$_2$, may advantageously be included in amounts less than about 3% by weight.

The glasses of this invention demonstrate good resistance to acids and weak bases. This faculty, combined with their extraordinarily dense opacity with no "Mother of Pearl" effect, i.e., an alignment or elongation of crystals which imparts an uneven texture thereto, has made these opal glasses eminently useful in the production of dinnerware.

We claim:

1. A spontaneous opal glass, wherein the opal phase consists of spherically-shaped particles, said particles consisting essentially of calcium-containing material and ranging in size up to at least about 0.5 micron in diameter, said glass consisting essentially, by weight on the oxide basis, of about 50–75% SiO$_2$, 10–20% CaO, 3–14% Al$_2$O$_3$, 3–10% R$_2$O, wherein R$_2$O consists of 0–7% Na$_2$O and 0–7% K$_2$O, 2–5% F, and 0.25–5% of one or more opacity-densifying agents selected from the group consisting of MoO$_3$, WO$_3$, and As$_2$O$_3$.

2. A spontaneous opal glass according to claim 1 consisting essentially, by weight on the oxide basis, of about 60–70% SiO$_2$, 5–13% Al$_2$O$_3$, 11–17% CaO, 3–6% Na$_2$O, 1–5% K$_2$O, 2–4% F, and 1–4% of one or more opacity-densifying agents selected from the group consisting of MoO$_3$, WO$_3$ and As$_2$O$_3$.

References Cited

UNITED STATES PATENTS

| | | | |
|---|---|---|---|
| 2,224,469 | 12/1940 | Blau | 106—52 |
| 2,571,242 | 10/1951 | Hood | 106—52 |
| 2,921,860 | 1/1960 | Stookey | 106—52 |
| 3,227,565 | 1/1966 | Tanigawa et al. | 106—39 DV |
| 3,238,085 | 3/1966 | Hayami et al. | 106—39 DV |
| 3,413,133 | 11/1968 | Stalego | 106—54 X |
| 2,960,802 | 11/1960 | Voss | 106—39 DV |

OTHER REFERENCES

McMillan, P.W.: Glass-Ceramics, New York, 1964 pp. 65–6. (TP 862–M3).

TOBIAS E. LEVOW, Primary Examiner

W. R. SATTERFIELD, Assistant Examiner

U.S. Cl. X.R.

65—33; 106—39 DV